United States Patent [19]

Dürr

[11] Patent Number: 5,255,604
[45] Date of Patent: Oct. 26, 1993

[54] PRESSURE FLUID SUPPLY VALVE ASSEMBLY

[75] Inventor: Reinhold R. Dürr, Würzburg, Fed. Rep. of Germany

[73] Assignee: Koenig & Bauer Aktiengesellschaft, Wurzburg, Fed. Rep. of Germany

[21] Appl. No.: 12,647

[22] Filed: Feb. 3, 1993

[30] Foreign Application Priority Data

Feb. 7, 1992 [DE] Fed. Rep. of Germany ....... 4203550

[51] Int. Cl.$^5$ .......................... B41F 27/06; B41F 27/12
[52] U.S. Cl. ................................. 101/389.1; 101/415.1
[58] Field of Search .................... 101/415.1, 378, 216, 101/389.1, 375; 29/113.1; 269/21, 25, 27, 31

[56] References Cited

U.S. PATENT DOCUMENTS

| | | | |
|---|---|---|---|
| 4,005,653 | 2/1977 | Arkell | 101/415.1 |
| 4,089,265 | 5/1978 | White et al. | 101/389.1 |

FOREIGN PATENT DOCUMENTS

| | | |
|---|---|---|
| 0215645 | 9/1986 | European Pat. Off. . |
| 3833684 | 10/1988 | Fed. Rep. of Germany . |
| 2137140 | 3/1983 | United Kingdom . |

*Primary Examiner*—J. Reed Fisher
*Attorney, Agent, or Firm*—Jones, Tullar & Cooper

[57] ABSTRACT

A pressure fluid supply valve assembly is supported by a cylindrical sleeve that is concentric with an axle journal of a printing unit cylinder. A fluid under pressure is supplied to a generally tubular or cylindrical housing and causes a movable valve member to move into contact with the axle journal. The pressure fluid passes through an outlet in the valve member into radial and axial pressure fluid ducts in the cylinder.

15 Claims, 3 Drawing Sheets

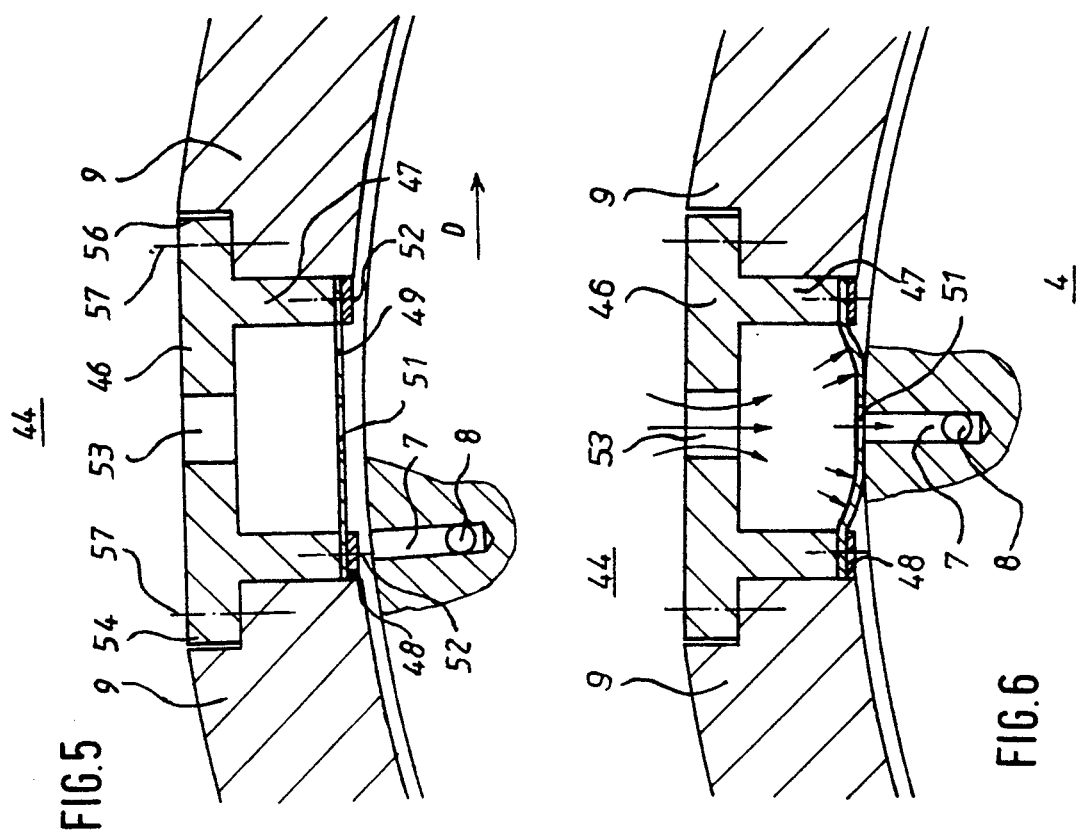
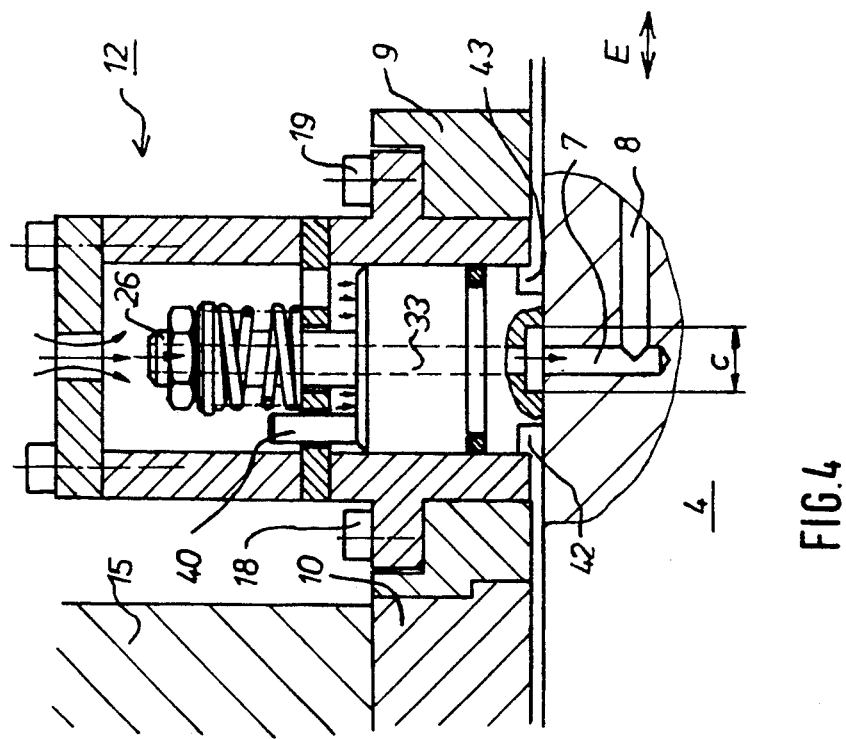

PRESSURE FLUID SUPPLY VALVE ASSEMBLY

FIELD OF THE INVENTION

The present invention is directed generally to a pressure fluid supply valve assembly. More particularly, the present invention is directed to a pressure medium supply valve assembly for use with a rotatable cylinder. Most specifically, the present invention is directed to a pressure fluid supply valve assembly for a rotatable cylinder in a printing press. The rotatable cylinder includes a plurality of various adjusting devices that are operated by either a positive or a negative pressure fluid which is supplied through axially and radially extending bores. The rotatable cylinder is susceptible of both axial and circumferential register adjustments. The pressure fluid supply valve assembly will accommodate such register adjustments while still accomplishing the supply of pressure to the radial and axial bores in the rotatable cylinder.

DESCRIPTION OF THE PRIOR ART

Various rotatable printing press cylinders are provided with different adjusting devices or driving elements that are operated by a pressure fluid, either positive or negative. This pressure fluid is supplied to the operating devices by one or more axially extending bores. These bores typically extend to the end of one of the journals which support the cylinder where they are coupled to a rotary supply union. Typical prior art devices for accomplishing this supply of pressure fluid to a rotatable cylinder are shown in the European published, unexamined patent application No. 0215645 and also in the U.S. Pat. No. 4,005,653. Both of these prior art documents disclose devices that are used to supply or evacuate air through the axle of the cylinder to thereby accomplish the securement of printing plates on the circumference of a forme cylinder. The pressure fluid, such as air at a positive or negative pressure is supplied to the cylinder through channels or similar openings.

These prior art devices supply the necessary pressure fluid along a supply duct or passage that is located on the axis of rotation of the printing unit cylinder. When it is necessary to provide the forme cylinder with a circumferential and lateral register adjustment capability, this requires the placement of auxiliary actuating mechanisms that are directed into the cylinder through a bore or bores which are positioned in the axle trunnion of the cylinder and along the axis of rotation. The two separate assemblies cannot both be placed in the same position. Thus in the prior art devices, it has not been possible to combine pressure fluid actuated adjusting devices or driving elements on a rotatable cylinder which may also be equipped with circumferential or lateral register adjustment devices since they both need the same space in which to operate.

It will be seen that a need exists for a solution to this problem so that pressure fluid operated devices can be used in cylinders that are also adapted to accomplish circumferential and lateral register adjustments. The pressure fluid supply valve assembly of the present invention provides such a device and is a significant advance in the art.

SUMMARY OF THE INVENTION

It is an object of the present invention to provide a pressure fluid supply valve assembly.

A further object of the present invention is to provide a pressure fluid supply valve assembly for a rotatable cylinder.

Another object of the present invention is to provide a pressure fluid supply valve assembly for a rotatable cylinder in a printing press.

Still a further object of the present invention is to provide a pressure fluid supply valve assembly that is usable with a journal of a rotatable cylinder.

Yet another object of the present invention is to provide a pressure fluid supply valve assembly that is usable with positive and negative pressure fluids.

Even still a further object of the present invention is to provide a pressure fluid supply valve assembly which will accommodate register adjustments of the cylinder.

As will be discussed in greater detail in the description of the preferred embodiments which are set forth subsequently, the pressure fluid supply valve assembly of the present invention is positioned on the outer peripheral surface of a cylindrical sleeve which overlies the journal or axle trunnion of the printing cylinder with which it is used. A movable valve member is guided in a radially extending bore in the cylindrical sleeve. A fluid under positive pressure is supplied to one side of the movable valve member which is moved into engagement with a peripheral surface of the axle journal of the cylinder. Radially and axially directed bores in the cylinder communicate with the movable valve member at the periphery of the axle journal so that either a positive or negative pressure fluid can be supplied through the movable valve member to the radially extending bore in the rotatable cylinder. In one embodiment the movable valve member is a slidable piston and in a second embodiment it is a flexible diaphragm.

The pressure fluid supply valve assembly of the present invention is usable to supply a fluid under pressure to interior, axially extending bores in a rotating printing press cylinder through a peripheral surface of the cylinder journal. This leaves the end faces of the cylinder journals or axle trunnions free so that the cylinder can also be provided with circumferential and lateral register adjusting assemblies. Thus the pressure fluid supply valve assembly of the present invention allows the printing press cylinder to have both pressure fluid activated adjusting devices or driving elements as well as register adjustment devices which require auxiliary actuating levers and the like that must pass through the end faces of the axle journals to be operative. In addition, the pressure fluid supply valve assembly will allow various circumferential or axial shifts of the cylinder and its axle journals to be accomplished while continuing to maintain fluid communication between the movable valve member of the supply valve assembly and the radial bore in the axle journal of the cylinder.

The pressure fluid supply valve assembly of the present invention allows pressure fluid to be supplied to the cylinder from different sources placed around the periphery of the cylindrical sleeve. This allows several different actuating devices on the cylinder to be actuated concurrently, either during rotation of the cylinder or when the cylinder is at a standstill. Thus various devices, such as tensioning bars for individual printing plates of a forme cylinder or the like can be actuated independently of each other. It is possible that a pressure medium, such as oil, could be used instead of compressed air. It is also possible to use a fluid with a negative pressure; i.e. a vacuum so that there are a number of various control possibilities that can be accomplished.

The pressure fluid supply valve assembly of the present invention overcomes the limitations of the prior art devices. It provides a device that will supply pressure media to rotatable bodies, such as cylinder, in printing presses in a manner which is a substantial advance in the art.

BRIEF DESCRIPTION OF THE DRAWINGS

While the novel features of the pressure fluid supply valve assembly in accordance with the present invention are set forth with particularity in the appended claims, a full and complete understanding of the invention may be had by referring to the detailed description of the preferred embodiments which are presented subsequently, and as illustrated in the accompanying drawings, in which:

FIG. 4 is an addition cross-sectional view of the first preferred embodiment of the supply valve assembly and taken along line IV—IV of FIG. 2;

FIG. 5 is a cross-sectional view of a second preferred embodiment of a pressure fluid supply valve assembly showing the valve assembly in its rest position; and FIG. 6 is a cross-sectional view similar to FIG. 5 and showing the second preferred embodiment of the valve assembly in its working position.

DESCRIPTION OF THE PREFERRED EMBODIMENTS

Figure 1:
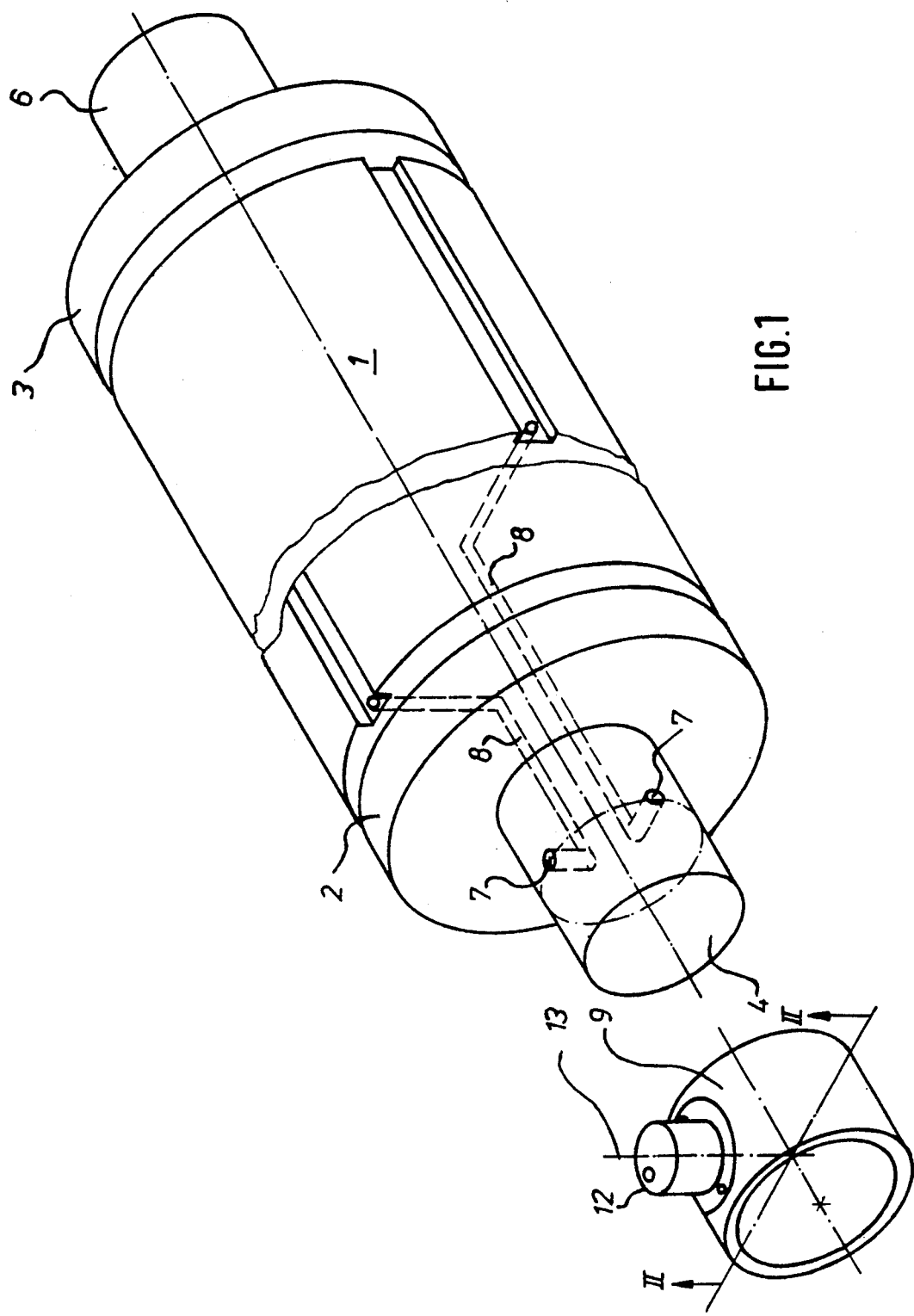
FIG. 1 is an exploded perspective schematic view of a printing unit cylinder with a bearing journal on which there is placed a pressure fluid supply valve assembly in accordance with the present invention.

Referring initially to FIG. 1, there may be seen generally at 1 a printing unit cylinder with which the pressure fluid supply valve assembly of the present invention may be utilized. The printing unit cylinder 1 has bearer rings or race rings 2 and 3 at both ends and is provided with journals or axle trunnions 4 and 6 at either end. These journals 4 and 6 are provided with a plurality of circumferentially spaced, radial bores 7, with there being, for example eight such radial bores 7 placed about each journal 4 or 6. Each radial bore 7 extends radially inwardly into the journal 4 or 6 until it intersects an axial bore 8. These axial bores 8 extend into the body of the cylinder 1 and into fluid cooperation with various adjusting elements and the like which are conventionally provided on the periphery of printing unit cylinders. Since these various adjusting elements are generally conventional, and form no part of the present invention, they will not be discussed in detail. The intersecting radial bores 7 and axial bores 8 form pressure medium ducts that will supply the fluid, which may be air at either a positive or negative pressure, or oil to the adjusting elements. While the printing unit cylinder 1 is depicted with bearer or race rings 2 and 3, it will be understood that these rings could be omitted. The printing unit cylinder 1 could also be executed as a forme cylinder and the pressure medium ducts 7 and 8 could lead to adjusting elements which are not specifically depicted that would actuate tensioning bars for use in holding flexible printing plates.

A cylindrical sleeve or tubular receptacle, generally at 9 is, as may be seen in FIG. 1 and also in FIGS. 2-5, positioned concentrically about the axial trunnion 4 at the end of the printing unit cylinder 1. This cylindrical sleeve 9 is secured to a bearing bushing 10, which is, in turn, held in a side frame 15 of the printing machine. The bearing bushing 10 and the side frame 15 are shown only in FIG. 4 and are not depicted elsewhere in the drawings for ease of illustration. A first embodiment of a pressure fluid supply valve assembly, generally at 12, is secured to the outer peripheral surface of the cylindrical sleeve 9, as may be seen in FIG. 1. This first preferred embodiment 12 of the pressure fluid supply valve assembly is depicted in detail in FIGS. 2-4. A second preferred embodiment, generally at 44 of the pressure fluid supply valve assembly is shown in FIGS. 5 and 6 of the drawings and will be discussed in detail subsequently. As may be seen in FIG. 1, the cylinder journal 4 is positionable within the cylindrical sleeve 9 so that the radial bores 7 are in alignment with a radially extending center line 13 of the supply valve assembly 12 so that during rotation of the cylinder 1, the radial bores or ducts 7 will align with the center line 13 of the supply valve assembly 12.

Figure 3:
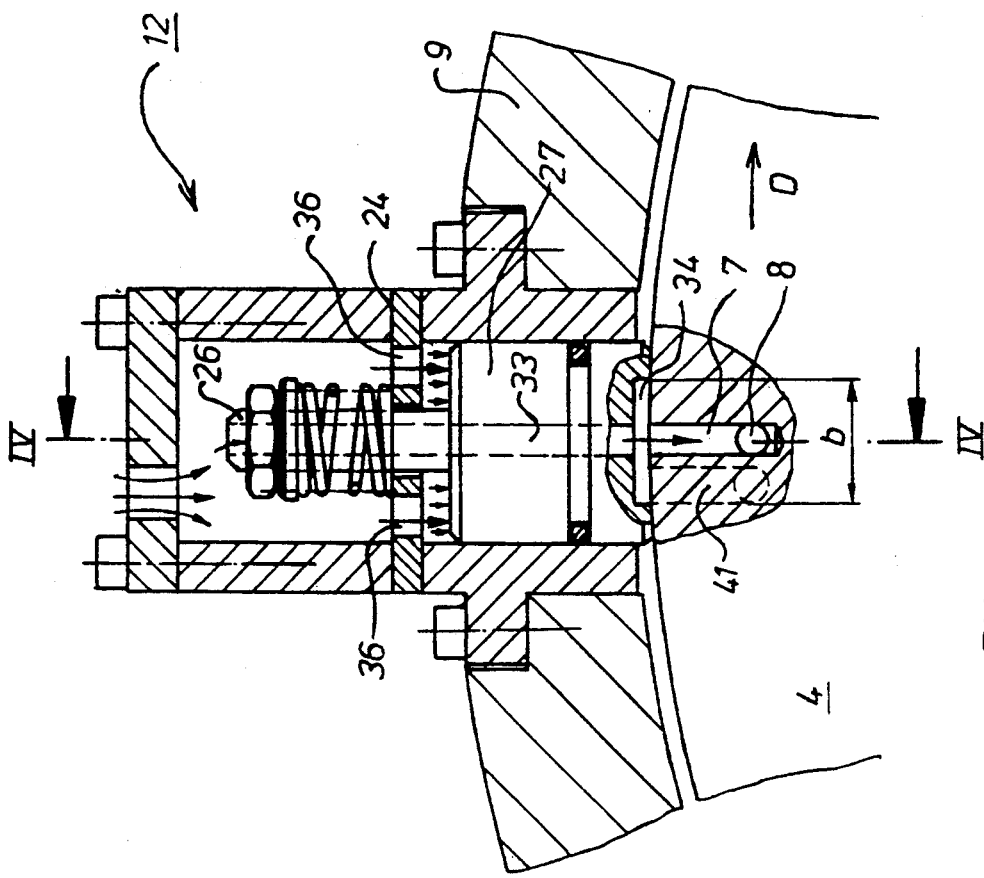
FIG. 3 is a view similar to FIG. 2 and showing the valve assembly in its working position.
Figure 2:
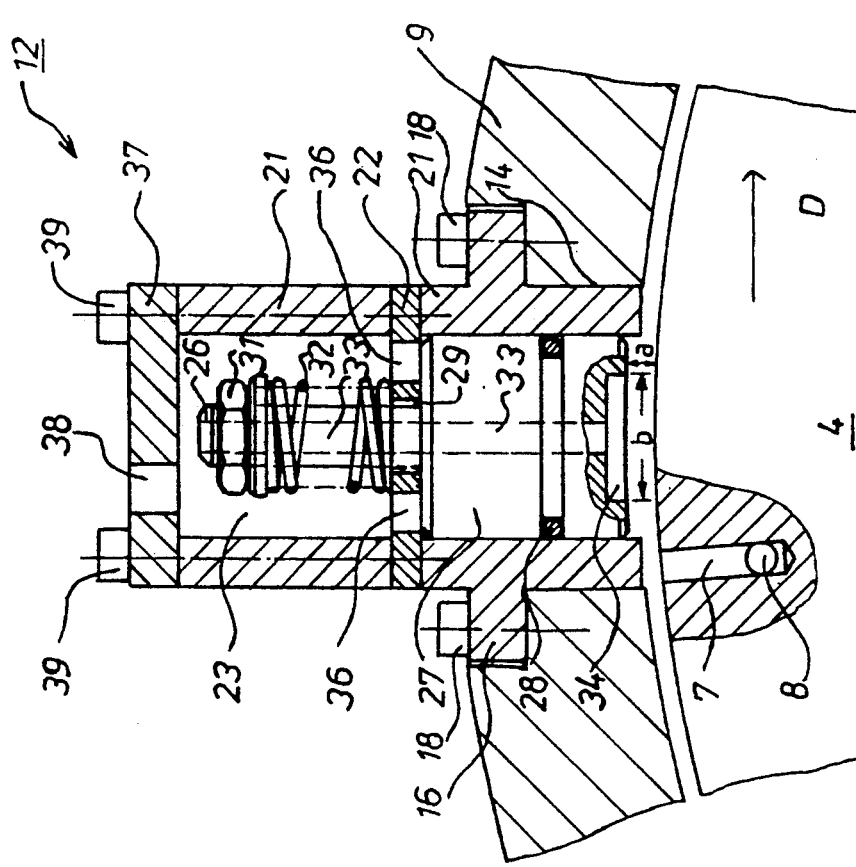
FIG. 2 is a cross-sectional view of a first preferred embodiment of the pressure fluid supply valve assembly taken along line II—II of FIG. 1 and showing the valve in its rest position.

Turning now primarily to FIGS. 2 and 3, it may be seen that the supply valve assembly 12 is received in an opening 14 in the cylindrical sleeve 9 and is secured in opening 14 by means of a flange 16 on a tubular housing 21 of the valve assembly 12 and a plurality of threaded bolts 18 and 19 which engage the flange 16 and the cylindrical sleeve 9 adjacent the housing receiving opening 14. The tubular housing 21 of the valve assembly 12 is divided along its length by a concentrically arranged central disk 22 into an upper space or chamber 23 and a lower space or chamber 24. A piston rod 26 passes through a central bore 29 in the disk 22. An upper end of piston rod 26 extends into the upper chamber 23 of the valve assembly 12 while a lower end of piston rod 26 is connected to a bottom end of a piston 27 which is slidably located in the lower chamber 24 of the tubular housing 21.

The piston 27 is reciprocable in the lower chamber 24 of the valve assembly 12 through a stroke length "a" as depicted in FIG. 2 which shows the piston in its rest position. A sealing ring 28 is placed around a skirt portion of piston 27 and this sealing ring 28 engages the inner surface of the tubular housing 21 to thereby seal the piston 27 in the tubular housing 21. The piston rod 26 which engages the bottom of the piston 27 and which extends through the central bore 29 in the disk 22 and up into the upper space or chamber 23 has an externally threaded free end. A nut 31 is threaded onto this free upper end of the piston rod 26 and is used to secure a first end of a compression spring 32 which is placed about the piston rod 26 with its second end in engagement with the disk 22.

As may be seen most clearly in FIGS. 2 and 3, the piston rod 26 has a longitudinally extending bore 33 formed at its center. This bore 33 extends along the axial length of the piston rod 26 from its upper, free end adjacent nut 31 down to its point of connection with the bottom of the piston 27. An elongated, groove shaped outlet 34 is formed in a front face of piston 27 and the longitudinal bore 33 extends through the piston 27 and terminates in this piston face outlet 34. The outlet groove 34 has a groove length "b" as seen in FIG. 2, and a groove width "c", as seen in FIG. 4. As will be discussed in detain shortly, the front face of the piston 27 acts as a sliding shoe on the peripheral surface of the journal 4. This piston front face is shaped to cooperatively engage the peripheral surface of journal 4 when the piston 27 is moved toward the journal 4.

Referring again to FIGS. 2 and 3, the housing disk 22 has a plurality of through bores 36 which are formed generally concentrically around the central bore 29 through which the piston rod 26 passes. These through bores 36 allow fluid communication between the upper chamber 23 and the lower chamber 24 in the tubular housing 21 of the pressure fluid supply valve assembly 12. The upper chamber 23 is closed at its upper end by a closure cap 37 that is provided with a fluid inlet at 38. The cap 37 is secured to the tubular housing 21 above the disk 22 and the disk 22 is secured to the lower portion of the tubular housing 21, all by elongated screws 39.

As may be seen in FIG. 4, the piston 27 carries a guide pin 40 which is secured to the bottom of the piston 27 and which extends through one of the concentrically arranged bores 36 in the disk 22 and into the upper chamber 23. This guide pin 40 is generally parallel to the piston rod 26 and serves as a guide for the piston 27 to insure that the piston 27 does not rotate in the tubular housing 21 and to thus insure that the cooperatively shaped front face of the piston 27 and the surface of the axle journal 4 do not move out of alignment.

Referring now to FIGS. 2, 3, and 4, the operation of the first preferred embodiment 12 of the pressure fluid supply valve assembly in accordance with the present invention will be discussed in detail. The printing unit cylinder 1 is caused to rotate in the direction indicated by the arrow D in FIG. 2 by any suitable means. As the cylinder 1 is rotated, or alternatively as it is being held still, a supply of fluid at a positive pressure is supplied to the upper chamber 23 of the valve assembly 12 through the fluid inlet 38 from any suitable source. This positive pressure fluid, which may be air, oil, or the like, enters the upper chamber 23 and passes through the plurality of concentric bores 36 on the disk 22 and engages the bottom of the piston 27 thereby causing the piston 27 to move against the force of the compression spring 32. In the situation where the cylinder 1 is rotating, the flow of pressure fluid to the valve assembly 12 is controlled in a known manner such that, as depicted in FIG. 3 when the cylinder 1 has reached the position in which the fluid conducting cylinder bores 7 and 8 are in the position 41 indicated by dashed lines, the front face of the piston 27 is moved through the stroke length "a" into engagement with the surface of the axle journal 4 and acts as a sliding sealing shoe. The path of the compressed fluid in the upper chamber 23 and through the concentric bores 36 is indicated by the plurality of small arrows in FIG. 4.

The compressed air or other fluid which is supplied to the upper chamber 23 of the housing 21 acts on the bottom of the piston 27 through the bores 36 as has been discussed above. This fluid under positive pressure thus moves the piston 27 against the sealing force of the sealing ring 28, the frictional force between the piston skirt and the inner wall of the tubular housing 21 and the force of the compression spring 32 through the stroke length "a" and into contact with the axle journal 4. At the same time, the pressure fluid also enters the bore 33 in the piston rod 26 and passes down the hollow rod 26 and through the piston 27 and into the piston front face groove 34. From there, the pressure fluid passes to the pressure medium receiving ducts 7 and 8 in the cylinder 1 so that the various adjusting and clamping elements carried by the cylinder 1 can be actuated. Because of the throttling effect of the bore 33 on the air, there is created a greater pressure in the upper chamber 23 and the lower chamber 24 than on the face of the piston. This insures that the piston 27 will move into its sliding seal position upon the application of pressurized fluid to fluid inlet 38 at the top of the tubular housing 21.

The supply of compressed air to the compressed air or other fluid ducts 7 and 8 continues during the rotation of the cylinder 1 until the piston face groove 34, with its length "b", passes out of contact with the radially extending bore 7. Supply of compressed air to bore 7 could also be interrupted by an air supply cut off valve that is not specifically depicted. As the printing cylinder 1 continues to rotate in the direction D, the next radial bore 7 will move into position beneath the piston face groove 34. This initiates the flow of the pressure fluid to the pressure ducts 7 and 8 so that the next adjusting assembly on cylinder 1 can accomplish the operation. The adjusting assembly can be, for example, a device for actuating tensioning bars for printing plates if the printing plate cylinder 1 is being used as a forme cylinder.

It is essential that the front sliding seat face of the piston 27 engages the rotating axle journal 4 with sufficient force to limit losses of fluid due to leakage. The necessary minimum impression pressure between the piston 27 and the axle journal 4 is maintained by use of lateral recesses 42 and 43 on the front face of the piston 27, as may be seen in FIG. 4. These lateral recesses insure that the surface of the sliding shoe is smaller that the surface of the bottom of the piston 27 so that there is maintained a sufficient sealing effect between the sliding shoe and the surface of the axle journal 4.

The width "c" of the groove 34 in the front face of the piston 27 is larger than the diameter of the radial bore 7, as may be seen in FIG. 4. This is advantageous, especially when the cylinder 1 is a forme cylinder that is shiftable axially to accomplish register adjustments. Since the cylindrical sleeve 9 is secured to the machine side wall 15 by the bearing bushing 10, if the cylinder is axially shifted in the direction indicated by the arrow E in FIG. 4, the width "c" of the groove 34 will insure continual fluid communication with the bore 7 and consequently with the bore 8.

It is also possible to utilize the first preferred embodiment 12 of the pressure fluid supply valve assembly of the present invention to apply a negative pressure to the pressure medium ducts 7 and 8. This may be necessary if the adjusting devices on the cylinder 1 require a vacuum to operate. This is accomplished by connecting a source of vacuum to the bore 33 in the piston rod 26. Compressed air or another pressure fluid such as oil will still be supplied to the upper chamber 23 through the fluid inlet 38 to cause the piston 27 to move toward the axle journal 4 through the stroke length "a".

A second preferred embodiment of a pressure fluid supply valve assembly in accordance with the present invention is shown generally at 44 in FIGS. 5 and 6. In this second preferred embodiment 44 there is provided a generally pot-shaped housing that includes a bottom surface 46, cylindrical side plate 47 and a lower edge 48. A movable valve member which is in the form of a flexible, disk-shaped sealing cover 49, that may be made of an elastic material such as rubber, is secured to the lower edge 48 of the cylindrical side plate 47 by means of spaced screws 52. This sealing cover or movable valve member 49 has an aperture 51 in its center with this central aperture 51 acting as an outlet for a pressure fluid which is supplied to the interior of the pot-shaped housing through a fluid inlet port 53 in the bottom 46 of the housing. A pair of butt straps or ears 54 and 56 extend outwardly from the pot-shaped housing generally in the plane of the bottom 46. These ears 54 and 56 are secured to the cylindrical sleeve 9 by suitable screws which are not specifically shown in FIGS. 5 and 6. The sleeve 9 is, in turn, secured to the machine frame in a manner similar to that used in the first preferred embodiment.

The second preferred embodiment 44 of the pressure fluid supply valve assembly of the present invention is depicted in its rest position in FIG. 5 and in its working position in FIG. 6. In operation, the fluid under pressure is supplied to the interior of the pot-shaped housing through the pressure inlet 53. This pressurizes the interior of the housing and deforms the movable valve member or sealing cover 49 toward the surface of the axle journal 4, as depicted in FIG. 5. This aligns the outlet aperture 51 in the flexible sealing cover 49 with one of the radial bores 7 as the axle trunnion 4 rotates in the direction indicated by arrow D in FIG. 5. The pressure fluid, such as compressed air or oil under pressure is able to pass through the outlet opening 51 and into the fluid medium ducts 7 and 8 so that it may operate the various actuating mechanisms carried by cylinder 1.

As may be seen most clearly in FIG. 6, the diameter of the outlet opening 51 in the sealing cover 49 is greater than the diameter of the radial bore 7. This insures that there will be a proper alignment between the outlet opening 51 and the radial bore 7 even if the cylinder 1 is shifted circumferentially or laterally to effect proper register. This oversizing of the outlet 51 effects a dimensioning of the outlet in the direction "a" and "b" analogously to FIGS. 3 and 4. When the supply of compressed fluid to the interior of the pot-shaped housing is decreased, the elastic sealing cover 49 will automatically return to the rest position which is shown in FIG. 4. The sealing cover 49 effects an essentially loss-free seal between itself and the peripheral surface of the surface of the axle journal 4 due to its elastic, resilient nature.

While preferred embodiments of a pressure fluid supply valve assembly in accordance with the present invention have been set forth fully and completely hereinabove, it will be apparent to one of skill in the art that a number of changes in, for example the overall size of the cylinder, the number of radial and axial bores, the source of the pressure fluid and the like can be made without departing from the true spirit and scope of the present invention which is accordingly to be limited only by the following claims.

What is claimed is:

1. A pressure fluid supply valve assembly which is usable with a rotatable cylinder, said pressure fluid supply valve assembly comprising:
    a rotatable cylinder having first and second cylinder journals with peripheral surfaces at opposite ends of said cylinder;
    at least a first radially extending, fluid medium conduit in a first of said cylinder journals;
    a fixed cylindrical sleeve supported on said first cylinder journal and concentric therewith;
    and first journal being rotatable within said sleeve
    a generally cylindrical housing carried by said sleeve, and extending radially through said cylindrical sleeve;
    a movable valve member supported in said cylindrical housing and having an outlet opening; and
    means to supply a fluid under pressure to said cylindrical housing to move said movable valve member into engagement with said peripheral surface of said first cylinder journal and into fluid communication with said radially extending fluid medium conduit.

2. The pressure fluid supply valve assembly of claim 1 wherein said cylindrical housing is divided by a disk into an upper chamber and a lower chamber and further wherein said movable valve member includes a piston supported in said lower chamber and a piston rod attached to a bottom surface of said piston and extending through a central bore in said disk into said upper chamber.

3. The pressure fluid supply valve assembly of claim 2 wherein said piston rod has an axially extending central bore with said central bore extending to a front face of said piston and forming said outlet opening.

4. The pressure fluid supply valve assembly of claim 3 wherein a compression spring is positioned about said piston rod in said upper chamber, said compression spring biasing said piston away from said first cylinder journal in said lower housing.

5. The pressure fluid supply valve assembly of claim 4 wherein said disk further includes a plurality of concentric apertures for providing fluid communication between said upper and lower chambers.

6. The pressure fluid supply valve assembly of claim 5 wherein said upper chamber in said cylindrical housing is limited by a cap having a pressure fluid inlet.

7. The pressure fluid supply valve assembly of claim 6 wherein said front face of said piston is structured as a sealing sliding shoe which is engageable with said peripheral surface of said first cylinder journal upon movement of said piston in said lower chamber toward said cylinder axle.

8. The pressure fluid supply valve assembly of claim 7 wherein said pressure fluid inlet is said means to supply said fluid under pressure to said cylindrical housing and further wherein said fluid under pressure passes through said concentric apertures in said disk and through said central bore in said piston rod.

9. The pressure fluid supply valve assembly of claim 7 wherein said sliding shoe of said piston is smaller in surface area than said bottom of said piston.

10. The pressure fluid supply valve assembly of claim wherein said cylindrical housing is generally pot-shaped and has a cylindrical side plate extending toward said first cylinder journal and terminating in a lower edge.

11. The pressure fluid supply valve assembly of claim 10 further including a disk-shaped sealing cover secured to said lower edge of said cylindrical side plate and forming said movable valve member.

12. The pressure fluid supply valve assembly of claim wherein said disk-shaped sealing cover has a centrally arranged outlet, said centrally arranged outlet providing said outlet opening in said movable valve member.

13. The pressure fluid supply valve assembly of claim 10 wherein said cylindrical housing has a bottom and further wherein said bottom of said housing has outwardly extending butt straps, said butt straps being securable to said cylindrical sleeve,

14. The pressure fluid supply valve assembly of claim wherein said at least first fluid medium conduit includes a radial bore and an axial bore in said first cylinder journal.

15. The pressure fluid supply valve assembly of claim 5 further including additional ones of said fluid medium conduits positioned radially around said peripheral surface of said first cylinder journal.

* * * * *